(12) United States Patent
Ostermeier

(10) Patent No.: US 6,887,018 B2
(45) Date of Patent: May 3, 2005

(54) CHUCK FOR ANNULAR CORE BIT

(75) Inventor: Peter Ostermeier, Diessen (DE)

(73) Assignee: Hilti Aktiengesellschaft, Schaan (LI)

( * ) Notice: Subject to any disclaimer, the term of this patent is extended or adjusted under 35 U.S.C. 154(b) by 69 days.

(21) Appl. No.: 10/624,877

(22) Filed: Jul. 21, 2003

(65) Prior Publication Data

US 2004/0018063 A1 Jan. 29, 2004

(30) Foreign Application Priority Data

Jul. 23, 2002 (DE) .......................................... 102 33 365

(51) Int. Cl.$^7$ ............................................. B23B 51/04
(52) U.S. Cl. ...................... 408/204; 408/239 R; 279/8; 279/141; 279/156
(58) Field of Search ................................ 408/204, 226, 408/239 R, 240; 279/8, 141, 156

(56) References Cited

U.S. PATENT DOCUMENTS

| | | | | |
|---|---|---|---|---|
| 4,072,441 A | * | 2/1978 | LaPointe ..................... | 408/204 |
| 5,108,235 A | * | 4/1992 | Czyzewski .................. | 408/204 |
| 5,175,963 A | | 1/1993 | Schafer et al. | |
| 5,352,071 A | * | 10/1994 | Cochran et al. ............ | 408/204 |
| 5,466,099 A | * | 11/1995 | Sullivan et al. ............. | 408/206 |
| 5,597,274 A | * | 1/1997 | Behner ........................ | 408/204 |
| 5,624,213 A | * | 4/1997 | Anderson .................... | 408/206 |
| 5,639,193 A | * | 6/1997 | Anderson .................... | 408/204 |
| 5,658,102 A | * | 8/1997 | Gale ............................ | 408/1 R |
| 5,813,802 A | * | 9/1998 | Ajimi et al. .................. | 408/68 |
| 5,868,532 A | * | 2/1999 | Spenser ....................... | 408/204 |
| 6,460,863 B1 | * | 10/2002 | Wuertz et al. ............... | 279/141 |
| 6,588,993 B2 | * | 7/2003 | Omi ............................ | 408/226 |
| 6,641,338 B2 | * | 11/2003 | Despres ...................... | 408/204 |

FOREIGN PATENT DOCUMENTS

| | | | | |
|---|---|---|---|---|
| DE | 3214209 | | 10/1983 | |
| DE | 3644440 | | 7/1988 | |
| JP | 08142040 A | * | 6/1996 | ............ B28D/1/14 |
| JP | 09019817 A | * | 1/1997 | ........... B23B/51/04 |
| JP | 09309016 A | * | 12/1997 | ........... B23B/51/04 |
| JP | 2004181624 A | * | 7/2004 | ........... B23B/51/04 |

OTHER PUBLICATIONS

Search Report.

* cited by examiner

*Primary Examiner*—Daniel W. Howell
*Assistant Examiner*—Ali Abdelwahed
(74) *Attorney, Agent, or Firm*—Sidley Austin Brown & Wood, LLP

(57) ABSTRACT

A chuck for an annular core bit (1) having an inner thread (2) includes a motor-driven rotatable spindle (4) having a threaded support (5) cooperating with the inner thread (2) for supporting the annular core bit (1), a stop member (7) associated with the axial stop flange (6) provided on the work spindle (4), locking wedge elements (9) for axially connecting the stop member (7) with the axial stop flange (6) under compressive strain, and a manually actuatable, displaceable release member (10) for displacing the locking wedge elements (9) between a position in which the locking wedge means (9) axially connects the stop member (7) and the axial stop flange (6) under compressive strain, and a position in which the stop member (7) is axially displaceable relative to the axial stop flange (6).

9 Claims, 2 Drawing Sheets

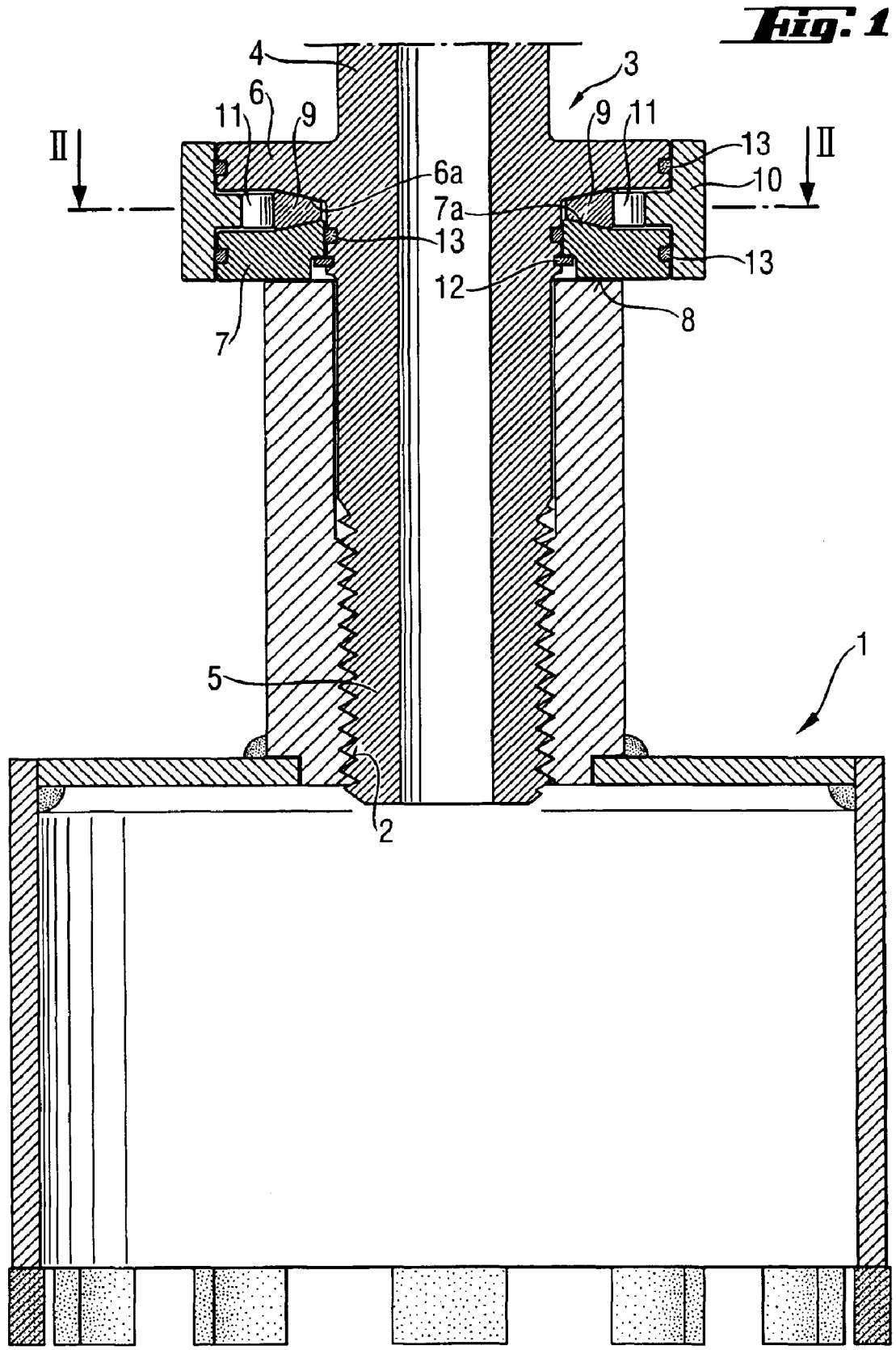

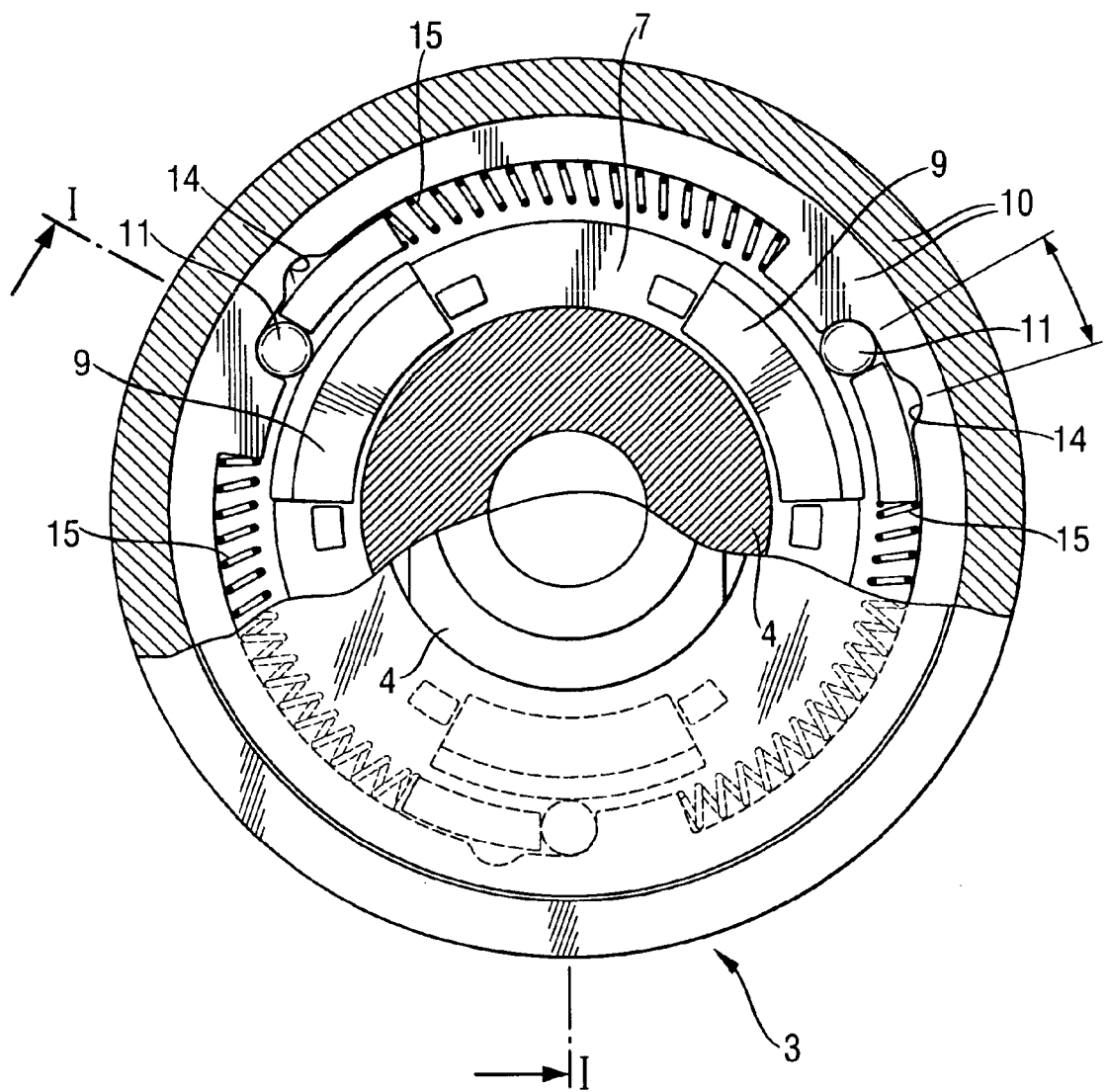

CHUCK FOR ANNULAR CORE BIT

BACKGROUND OF THE INVENTION

1. Field of the Invention

The present invention relates to a motor-driven, rotatable chuck for an annular core bit for working brittle materials, such as stone, concrete or masonry.

2. Description of the Prior Art

During working of brittle materials with a rotatable annular core bit formed of a cylindrical tube provided at its end surface with grinding or cutting members and having a diameter, usually, of more than 100 mm, high torques and axial forces are transmitted from a chuck to the bit through a shank end of the bit having a diameter, usually, of less than 50 mm, e.g., with an inner thread of 1¼"

With simple chucks having a rotatable spindle with a threaded support and an axial stop flange, which are only discussed here, high torques and high axial forces lead to frictional bonding of the shank end in the chuck. As a result, replacement of an annular core bit is usually rather cumbersome, time-consuming, and is possible only with a special mounting tool. Despite these drawbacks, the market for such chucks for annular core bits expands.

According to U.S. Pat. No. 4,911,253, European Publication EP-253581, and German Utility Model DE-299 18 965 U1, a motor-driven chuck for an annular core bit/annular core bit adapter has a threaded support and an axial stop flange. For releasing the frictional bond between the axial stop flange and the threaded support of the chuck and the jammed annular core bit/annular core bit adapter, a wrench adapted to the hexagon of the shank end of the annular core bit/annular core bit adapter is required.

A quick-action coupling for a tool-free replacement of an annular core bit, which is disclosed in DE-299 18 965 U1, is not suitable for chucks having a threaded support.

German Patent DE-38 24 040 C1 discloses a locking device formed as a barrel nut for a stop member which is arranged between the nut and a working tool mountable on al threaded support with an axial stop flange and at the working tool side of the axial stop flange. The axial stop member is axially displaceable, within narrow limits, and is pressed axially against the barrel nut by locking wedge means displaceable within narrow limits. The locking wedge means are released with a manually actuated, displaceable release member. DE-38 24 040 C1 discloses a locking device for a disc-shaped working tool and is not suitable for an annular core bit with an inner thread.

An object of the invention is a chuck with a threaded support and an axial stop flange and which would enable an easy replacement of an annular core bit with an inner thread.

SUMMARY OF THE INVENTION

This and other objects of the present invention, which will become apparent hereinafter, are achieved by a chuck including a motor-driven rotatable spindle having a threaded support cooperating with the inner thread for supporting the annular core bit and an axial stop flange, and a stop member associated with the axial stop flange, provided at a working tool side of the axial stop flange. The stop member is axially connectable with the axial stop flange under compressive strain, and is axially displaceable relative thereto, within predetermined limits, for replaceably securing the annular core bit, with displaceable, within predetermined limits, locking wedge means which provides for axially connection the stop member with the axial stop flange under compressive strain. A manually actuatable, displaceable release member is provided for displacing the locking wedge means between a position in which the locking wedge means axially connects the stop member and the axial stop flange under compressive strain, and a position in which the stop member is axially displaceable relative to the axial stop flange.

With a stop member according to the present invention which is releasable connected with the axial stop flange under compressive strain, a conventional annular core bit with an inner thread, which correspond to a chuck support thread, can be easily replaced without using any auxiliary tool. This is because the locking wedge means is easily releasable with a manually operated release member, whereby the compressive strain connection between the stop member and the axial stop flange is also released. As a result, the frictional connection between the stop member and the shank end of the annular core bit can be broken by displacement of the stop member axially in the direction toward the power tool. The chuck according to the present invention permits replacement of a conventional annular core bit with an inner thread without an auxiliary tool that had to be used previously.

Advantageously, the locking wedge means is formed as annual wedge means tapering radially inwardly, which permits to release the compressive strain connection by displacing the wedge means in the radial direction.

Advantageously, the release member is formed as a manually rotatable, accessible from outside, stop ring having a guide profile spaced from the locking wedge means by two different distances corresponding to the two positions of the locking wedge means. With such release member, release of the locking wedge means can be effected by a limited rotational movement of the release member.

Advantageously, displaceable stop bodies, preferably, balls, cones, rollers, are provided between the release member and the locking wedge means or wedges. Thereby, the wedge means is displaced wear-free between its two positions by the release member.

Advantageously, the stop bodies are pre-loaded with spring means that automatically displace, with the wedge means, the stop member away from the stop flange. Thereby, after release of the annular core bit by the release member the stop member is displaced automatically to its maximum axially spaced stop position. In this position, the stop member is reliably retained against an automatic release under a dynamic load.

Advantageously, the axial displacement of the stop member is limited, at the working tool side, by a snap ring securable on the chuck spindle. This insures an easy assembly of the chuck.

Advantageously, the stop member is formed as a deflection-resistant stop ring which is provided, on its working tool side, with an axial flange surface and, on its power tool side with an annular wedge surface which insures as uniform as possible loading of the contact surface.

Advantageously, the axial stop flange has, at its working tool side an annular wedge surface formed as a result of a stop flange thickness increasing radially inwardly. With such wedge surface, the wedge angle is increased which prevents self-jamming of the wedge means which might have been caused by frictional forces.

Advantageously, annular sealing rings, preferably O-rings, are provided, respectively, between the axial stop flange, the release member and the stop member. The sealing rings are located in respective sealing grooves. The sealing rings prevent, in particular the locking wedge means from contamination.

The novel features of the present invention, which are considered as characteristic for the invention, are set forth in the appended claims. The invention itself, however both as to its construction and its mode of operation, together with additional advantages and objects thereof, will be best understood from the following detailed description of the preferred embodiment, when read with reference to the accompanying drawings.

BRIEF DESCRIPTION OF THE DRAWINGS

The drawings show:

FIG. 1 a longitudinal cross-sectional view of a chuck according to the present invention; and FIG. 2 a cross-sectional view along II—II in FIG. 1.

DETAILED DESCRIPTION OF THE PREFERRED EMBODIMENT

A chuck 3 according to the present invention for an annular core bit 1 having a thread 2 and which is shown in FIG. 1, includes a rotatable work spindle 4. The work spindle 4 forms a threaded support 5 and an axial stop flange 6. The axial stop flange 6 has, at its working tool side, an annular wedge surface 6a, formed as a result of the thickness of the stop flange increasing radially inwardly. A stop member 7, which cooperates with the working tool side of the stop flange 6 and is connected therewith with a possibility of a limited axial movement, forms an axial flange surface 8 at its working tool side and, at its power tool side, an annular wedge surface 7a which is formed as a result of the thickness of the stop member 7 increasing radially inwardly. The stop member 7, which is formed as a deflection-resistant stop ring, is axially connectable, under compressive strains, with the axial stop flange 6 by three locking wedges 9 which taper radially inwardly and are arranged between the axial stop flange 6 and the stop member 7 with a possibility of a limited radial displacement. The locking wedges 9 are released from their straining condition by being displaced radially outwardly with a release member 10 which is formed as a manually rotatable stop ring which is manually actuated and is accessible from outside. Three, radially displaceable, roller-shaped stop bodies 11 are arranged between the release member 10 and the locking wedges 9, respectively. A snap ring 12, which is secured on the work spindle 4, limits the axial displacement of stop member 7 at the working tool side of the stop member 7. Between the axial stop flange 6, the release member 10, and the stop member 7, there are provided, respectively, sealing O-rings 13 received in respective sealing grooves.

As shown in FIG. 2, the rotatable release member 10 forms two guide profiles 14 which are associated with the respective locking wedges 9 and which are spaced by different radial distances from the respective locking wedges 9 in two different positions of the rotatable release member 10. The stop bodies 11 are preloaded with respective springs 15 which automatically bias the locking wedges 9 radially inwardly with respect to the guide profiles.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the append claims.

What is claimed is:

1. A chuck for an annular core bit (1) having an inner thread (2), comprising a motor-driven rotatable spindle (4) having a threaded support (5) cooperating with the inner thread (2) for supporting the annular core bit (1), and an axial stop flange (6); a stop member (7) associated with the axial stop flange (6), provided at a working tool side of the axial stop flange (6), axially connectable with the axial stop flange (6) under compressive strain, and axially displaceable relative thereto, within predetermined limits, for replaceably securing the annular core bit (1); displaceable, within predetermined limits, locking wedge means (9) for axially connecting the stop member (7) with the axial stop flange (6) under compressive strain; and a manually actuatable, displaceable release member (10) for displacing the locking wedge means (9) between a position in which the locking wedge means (9) axially connects the stop member (7) and the axial stop flange (6) under compressive strain, and a position in which the stop member (7) is axially displaceable relative to the axial stop flange (6).

2. A chuck according to claim 1, wherein the locking wedge means (9) is formed as annular wedge means tapering radially inwardly.

3. A chuck according to claim 1; wherein the release member (10) is formed as a manually rotatable, accessible from outside, stop ring having a guide profile (14) spaced from the locking wedge means (9) by two different distances corresponding to the two positions of the locking wedge means (9).

4. A chuck according to claim 1, further comprising displaceable stop bodies (11) provided between the release member (10) and the locking wedge means (9).

5. A chuck according to claim 4, further comprising spring means (15) for pre-loading the stop bodies (11) and for automatically axially displacing, via the locking wedge means (9), the stop member (7) away from the axial stop flange (6).

6. A chuck according to claim 1, further comprising a snap ring (12) provided at a working tool side of the stop member (7) and securable to the work spindle (4) for limiting axial displacement of the stop member (7).

7. A chuck according to claim 1, wherein the stop member (7) is formed as a deflection-resistant stop ring provided, on a working tool side thereof with an axial flange surface (8) and, on a power tool side thereof with an annular wedge surface (7a) formed as a result of a thickness thereof increasing radially inwardly.

8. A chuck according to claim 1, wherein the axial stop flange (6) has, at a working tool side thereof, an annular wedge surface (6a) formed as a result of a stop flange thickness increasing radially inwardly.

9. A chuck according to claim 1, further comprising annular sealing rings (13) provided, respectively, between the axial stop flange (6), the release member (10), and the stop member (7) and located in respective sealing grooves.

* * * * *